(12) United States Patent
Lee et al.

(10) Patent No.: US 12,166,903 B2
(45) Date of Patent: Dec. 10, 2024

(54) COMPUTING DEVICE IN A TRUSTED COMPUTING SYSTEM AND ATTESTATION METHOD THEREOF

(71) Applicant: SAMSUNG ELECTRONICS CO., LTD., Suwon-si (KR)

(72) Inventors: Seungho Lee, Seoul (KR); Sohyun Park, Suwon-si (KR); Yunho Youm, Osan-si (KR); MyungSik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 17/859,263

(22) Filed: Jul. 7, 2022

(65) Prior Publication Data

US 2023/0163976 A1    May 25, 2023

(30) Foreign Application Priority Data

Nov. 23, 2021   (KR) ................. 10-2021-0161831

(51) Int. Cl.
  *H04L 9/32* (2006.01)
  *G06F 21/44* (2013.01)
  *H04L 9/30* (2006.01)

(52) U.S. Cl.
  CPC ............ *H04L 9/3249* (2013.01); *G06F 21/44* (2013.01); *H04L 9/30* (2013.01)

(58) Field of Classification Search
  CPC ....... H04L 9/3249; H04L 9/30; H04L 9/3247; H04L 9/32; G06F 21/44
  USPC .................................................. 713/176, 180
  See application file for complete search history.

(56) References Cited

U.S. PATENT DOCUMENTS

| | | | |
|---|---|---|---|
| 8,312,271 B2 | 11/2012 | Bangerter et al. | |
| 8,555,072 B2 | 10/2013 | Camenisch et al. | |
| 10,187,385 B2 | 1/2019 | Shaliv et al. | |
| 10,248,791 B2 | 4/2019 | Pappachan et al. | |
| 10,735,205 B1 | 8/2020 | Wentz et al. | |
| 10,938,570 B2 | 3/2021 | Misoczki et al. | |
| 2017/0317835 A1* | 11/2017 | Nishio | H04L 9/3263 |
| 2018/0124602 A1* | 5/2018 | Nair | H04W 12/06 |
| 2019/0364042 A1 | 11/2019 | Liu et al. | |
| 2020/0344051 A1* | 10/2020 | Ashrafi | H04L 9/0852 |

(Continued)

FOREIGN PATENT DOCUMENTS

KR   10-2018-0069856 A   6/2018

*Primary Examiner* — Kaylee J Huang
(74) *Attorney, Agent, or Firm* — Sughrue Mion, PLLC

(57) ABSTRACT

A computing device in a trusted computing (TC) system and an attestation method thereof are provided. The computing device includes at least one processor configured to operate as instructed by program code, the program code including: transmission code configured to cause the at least one processor to transmit, to a master controller, a first identification (ID) for a first device selected among a plurality of devices included in the TC system, a second ID for a second device selected among the plurality of devices, and a nonce; and attestation code configured to cause the at least one processor to perform attestation for the first device and the second device based on an aggregated signature, wherein the aggregated signature is based on generation of a first signature, by the first device, by using the nonce, and generation of a second signature, by the second device, by using the first signature.

20 Claims, 13 Drawing Sheets

(56) References Cited

U.S. PATENT DOCUMENTS

2021/0099292 A1\* 4/2021 Gilton .................. H04L 9/3247
2021/0149062 A1\* 5/2021 Shin ..................... H04W 12/12

\* cited by examiner

Chain scheme

Verification scheme

COMPUTING DEVICE IN A TRUSTED COMPUTING SYSTEM AND ATTESTATION METHOD THEREOF

CROSS-REFERENCE TO RELATED APPLICATION

This application claims priority from Korean Patent Application No. 10-2021-0161831 filed on Nov. 23, 2021 in the Korean Intellectual Property Office, and all the benefits accruing therefrom under 35 U.S.C. 119, the disclosure of which is herein incorporated by reference in its entirety.

BACKGROUND

1. Technical Field

The present disclosure relates to a computing device in a trusted computing (TC) system and an attestation method thereof.

2. Description of the Related Art

In a computing environment that provides the Internet, various hacking attacks are increasing, and continuous security patching of operating systems or software for preventing such hacking attacks is regarded as an essential element. Accordingly, attempts have been made to fundamentally solve these problems, and as a result, a trusted computing (TC) technology has been researched and developed.

The trusted computing technology is a technology that imposes reliability so that a computer may operate as being intended, and is a technology that intends to apply a hardware-based security chip such as a trusted platform module (TPM) in common to all devices with computing power, and to provide software for this as an open standard. The trusted computing technology may be widely used on platforms where, for example, computer authentication, networks, printing, mobile phones, application security, and the like are used.

When a verifier having security accesses a platform (e.g., a cloud platform) including a plurality of devices, the verifier needs to perform security attestation for the plurality of devices in the platform, and in this case, when the verifier performs individual security attestations for all of the plurality of devices in the platform, an attestation overhead of the verifier may increase.

SUMMARY

Aspects of example embodiments of the present disclosure provide a trusted computing system that reduces overhead in an attestation operation of a verifier in a trusted computing environment.

Aspects of example embodiments of the present disclosure provide an attestation method of a trusted computing system that reduces overhead in an attestation operation of a verifier in a trusted computing environment.

According to an aspect of an example embodiment of the disclosure, there is provided a computing device in a trusted computing system, the trusted computing system including a plurality of devices and a master controller configured to control the plurality of devices, the computing device including: at least one memory configured to store program code; and at least one processor configured to read the program code and operate as instructed by the program code, the program code including: transmission code configured to cause the at least one processor to transmit, to the master controller, a first identification (ID) for a first device selected among the plurality of devices, a second ID for a second device selected among the plurality of devices, and a nonce; receiving code configured to cause the at least one processor to receive an aggregated signature from the master controller; and attestation code configured to cause the at least one processor to perform attestation for the first device and the second device based on the aggregated signature, wherein the aggregated signature is based on generation of a first signature, by the first device, by using the nonce, and generation of a second signature, by the second device, by using the first signature.

According to an aspect of an example embodiment of the disclosure, there is provided an attestation method of a computing device, in a trusted computing system including a plurality of devices and a master controller configured to control the plurality of devices, the attestation method including: transmitting, to the master controller, a first identification (ID) for a first device selected among the plurality of devices, a second ID for a second device selected among the plurality of devices, and a nonce; receiving an aggregated signature from the master controller; and performing attestation for the first device and the second device based on the aggregated signature, wherein the aggregated signature is based on generation of a first signature, by the first device, by using the nonce, and generation of a second signature, by the second device, by using the first signature.

According to an aspect of an example embodiment of the disclosure, there is provided a computing device, included in a trusted computing system including a plurality of devices and a master controller configured to control the plurality of devices, the computing device including: a verifier configured to attest reliability of target devices among the plurality of devices, wherein the verifier is further configured to transmit, to the master controller, a verification request for the target devices, and attest the reliability of the target devices using an aggregated signature received from the master controller, the aggregated signature being generated by combining signatures of each of the target devices.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, various example embodiments will be described with reference to the accompanying drawings.

Figure 1:
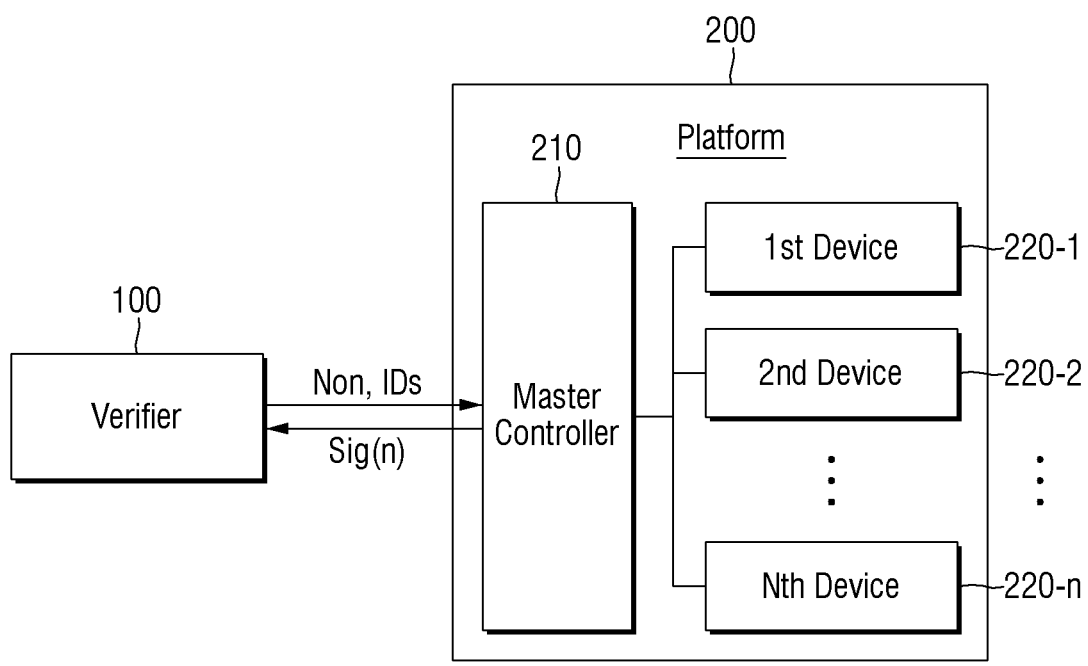
FIG. 1 is a block diagram illustrating a trusted computing system according to some exemplary embodiments.

FIG. 1 is a block diagram illustrating a trusted computing system according to some exemplary embodiments.

Referring to FIG. 1, a trusted computing system 10 includes a verifier 100 and a platform 200.

The verifier 100 is a user who intends to use the platform 200 and may be a user who requests a service from the platform 200. The verifier 100 may perform an operation of attesting reliability of whether the platform 200 is trusted, and may correspond to a computing device in a trusted computing system in the present disclosure. The verifier 100 may include, for example, any electronic device such as personal computers, cell phones, handheld messaging devices, laptop computers, set-top boxes, personal digital assistants, or electronic book readers. Although not shown in FIG. 1, the verifier 100 may include at least one memory configured to store program code, and at least one processor configured to read the program code and operate as instructed by the program code, and the verifier 100 may include a hardware component which performs a function and an operation of the verifier 100 described below, a computer program code for executing a function and an operation of the verifier 100 described below, or an electronic recording medium, e.g., a processor, equipped with the computer program code. In other words, the verifier 100 may be a functional and/or structural combination of hardware for realizing the inventive concept and/or software for running the hardware.

The platform 200 includes a master controller 210 and a plurality of devices 220-1 to 220-n, where n is a natural number. The master controller 210 may control an overall operation of the platform 200. In addition, the master controller 210 may communicate with the devices 220-1 to 220-n included in the platform 200. For example, the master controller 210 may send a command to the plurality of devices 220-1 to 220-n. The master controller 210 may be, for example, a baseboard management controller (BMC), a trusted platform module (TPM), or a secure processor. Each of the plurality of devices 220-1 to 220-n may be, for example, a central processing unit (CPU), a graphic processing unit (GPU), a storage device, or a network interface card (MC). The storage device may include, for example, a 2D NAND memory array or a 3D (or vertical) NAND (VNAND) memory array. As another example, the storage device may include various other types of non-volatile memories. For example, the storage device may be a storage device to which a magnetic random access memory (MRAM), a spin-transfer torque MRAM, a conductive bridging RAM (CBRAM), a ferroelectric RAM (FeRAM), a phase RAM (PRAM), a resistive RAM, and various other types of memories are applied.

When the verifier 100 intends to attest the reliability of all of the plurality of devices 220-1 to 220-n of the platform 200, an overhead may occur in the attestation process of the verifier 100. Therefore, the trusted computing system 10 according to some exemplary embodiments may select some devices that the verifier 100 intends to access among the plurality of devices 220-1 to 220-n as target devices, and then perform reliability attestation only on the target devices. When selecting the target devices, the verifier 100 may designate a signature order of the target devices.

In this case, the verifier 100 needs a signature of each of the target devices in order to perform reliability attestation for the target devices. The signature may be generated using a secret key possessed by each of the target devices. The trusted computing system 10 according to some exemplary embodiments does not send all signatures of each of the target devices to the verifier 100. That is, the target devices may generate one aggregated signature by combining or chaining respective signatures in an order determined by the verifier 100, and send one aggregated signature to the verifier 100.

That is, since the verifier 100 does not verify the signatures of all target devices, but uses only one aggregated signature to perform reliability attestation for all of the target devices, the overhead in the attestation operation of the trusted computing system 10 may be reduced.

Hereinafter, an operation of the trusted computing system 10 according to some exemplary embodiments will be described in detail.

For example, the verifier 100 sends a nonce (Non) value and IDs of target devices requiring reliability attestation to the master controller 210. In an embodiment, the verifier 100 may transmit, to the master controller 210, information about an order in which signatures of the target devices are to be combined or chained. Thereafter, the target devices generate one aggregated signature by combining or chaining respective signatures in an order determined by the verifier 100, and send one aggregated signature Sig(n) to the verifier 100. Thereafter, the verifier 100 performs reliability attestation for all target devices using only one aggregated signature.

This will be briefly described with reference to a ladder diagram of FIG. 2.

Figure 2:
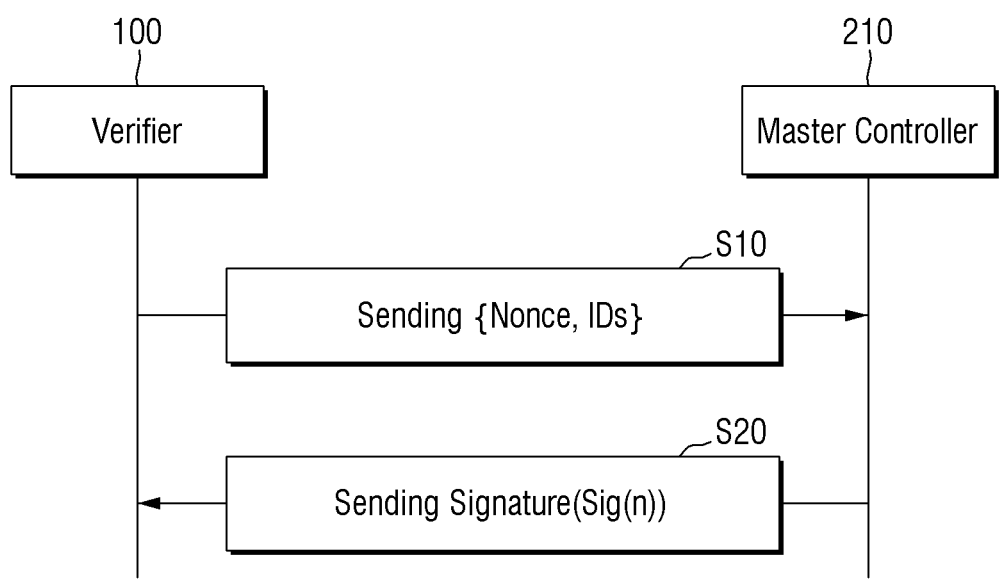
FIG. 2 is a ladder diagram illustrating an operation between a verifier and a master controller according to some exemplary embodiments.

FIG. 2 is a ladder diagram illustrating an operation between the verifier and the master controller according to some exemplary embodiments.

Referring to FIGS. 1 and 2, the verifier 100 sends a nonce (Non) value and IDs of target devices requiring reliability attestation to the master controller 210 (S10).

Thereafter, the target devices generate one aggregated signature by combining or chaining respective signatures in an order determined by the verifier 100, and send one aggregated signature Sig(n) to the verifier 100 (S20). Thereafter, the verifier 100 performs reliability attestation for all target devices using only one aggregated signature.

An operation of the trusted computing system 10 according to some exemplary embodiments described above will be described in a flowchart.

Figure 3:
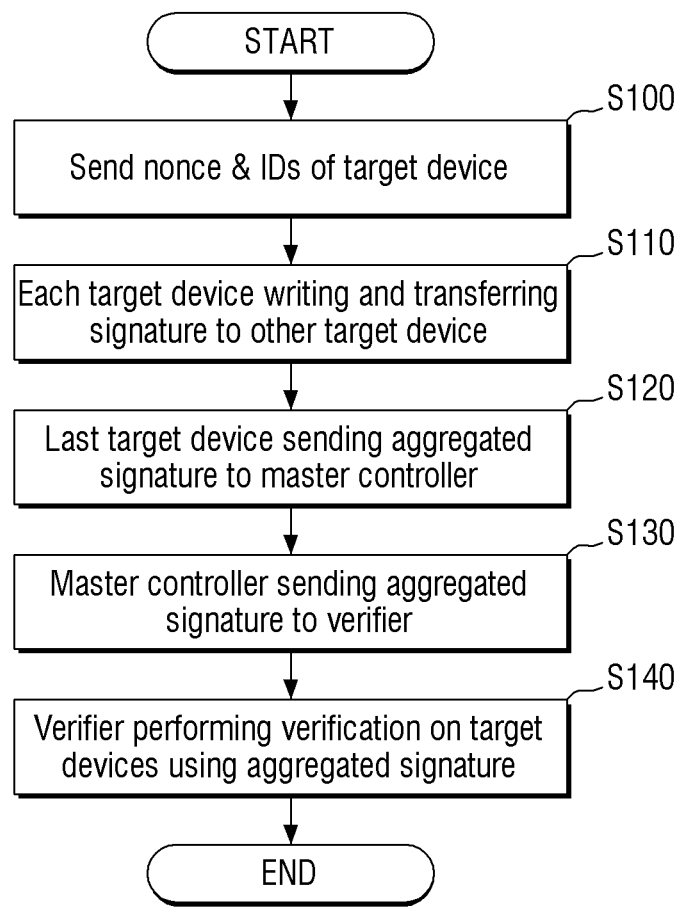
FIG. 3 is a flowchart illustrating an attestation method of a trusted computing system according to some exemplary embodiments.

FIG. 3 is a flowchart illustrating an attestation method of a trusted computing system according to some exemplary embodiments.

Referring to FIGS. 1 and 3, first, the verifier 100 sends a nonce (Non) value and IDs of target devices requiring reliability attestation to the master controller 210 (S100).

Thereafter, the target devices combine or chain the respective signatures in an order determined by the verifier 100 (S110).

Thereafter, the last target device in the order determined by the verifier 100 among the target devices sends one aggregated signature Sig(n) generated by the target devices combining or chaining the respective signatures in the order determined by the verifier 100 to the master controller 210 (S120).

Thereafter, the master controller 210 sends one aggregated signature Sig(n) to the verifier 100 (S130).

The verifier 100 uses the received one aggregated signature Sig(n) to perform verification on the target devices, and more specifically, the reliability attestation (S140).

Hereinafter, an operation in which target devices generate one aggregated signature Sig(n) generated by combining or chaining the respective signatures in an order determined by the verifier 100 will be described in detail with reference to FIGS. 4 to 6.

Figure 4:
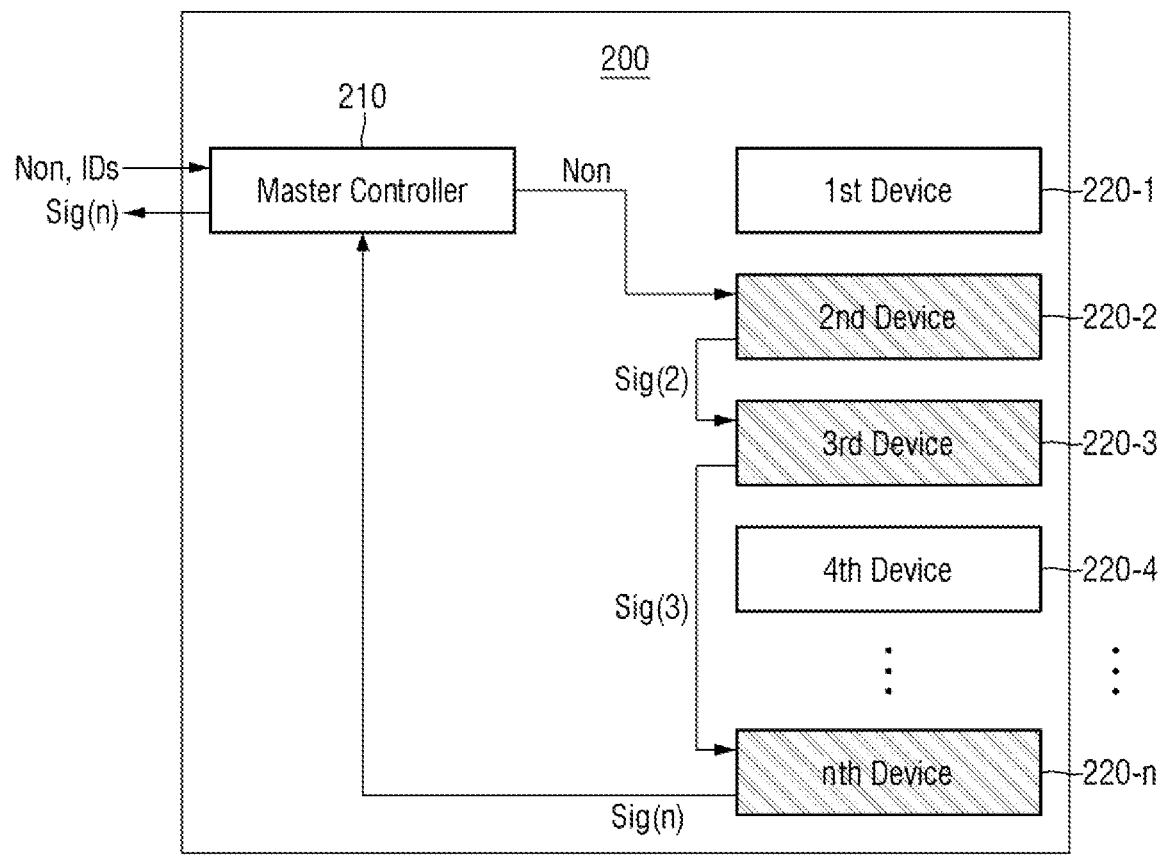
FIG. 4 is an exemplary block diagram illustrating an operation within a platform for describing an attestation method of a trusted computing system according to some exemplary embodiments.

FIG. 4 is an exemplary block diagram illustrating an operation within a platform for describing the attestation method of the trusted computing system according to some exemplary embodiments. FIG. 5 is an exemplary diagram illustrating an operation within a platform for generating an aggregated signature according to some exemplary embodiments. FIG. 6 is a flowchart illustrating the operation of FIG. 5.

Figure 5:
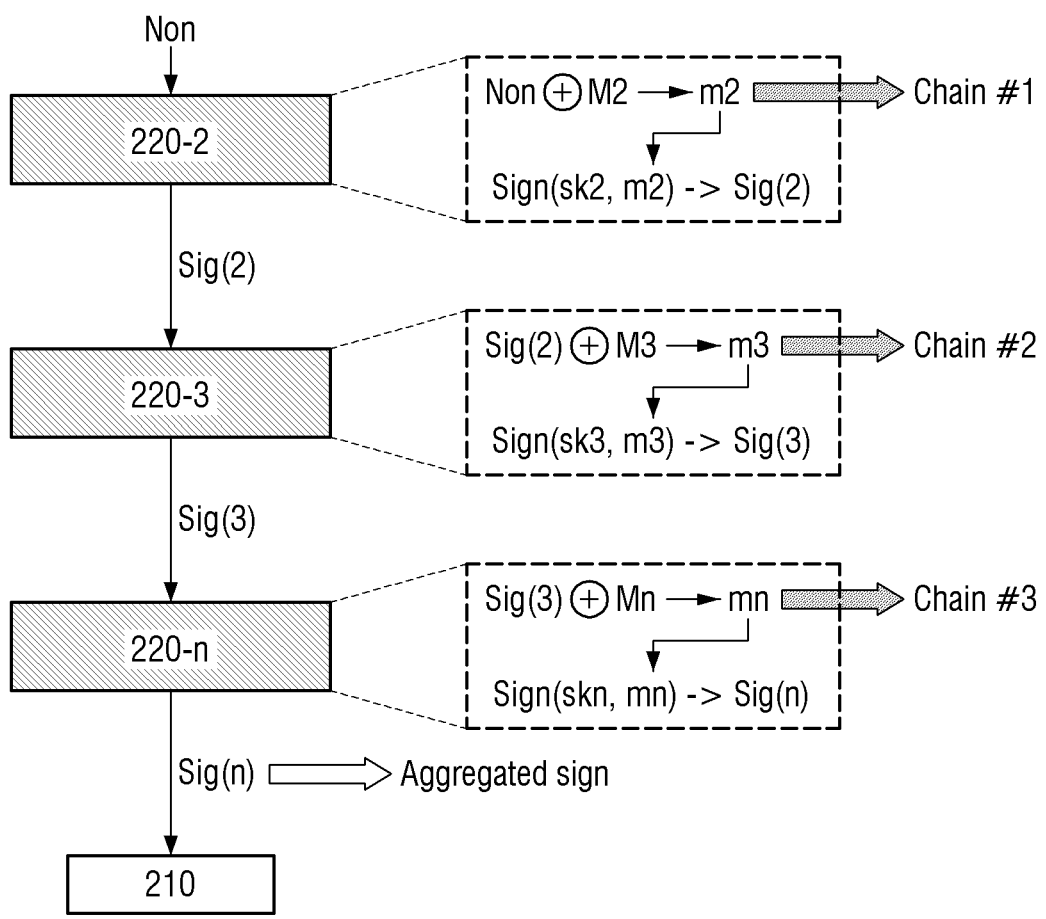
FIG. 5 is an exemplary diagram illustrating an operation within a platform for generating an aggregated signature according to some exemplary embodiments.
Figure 6:
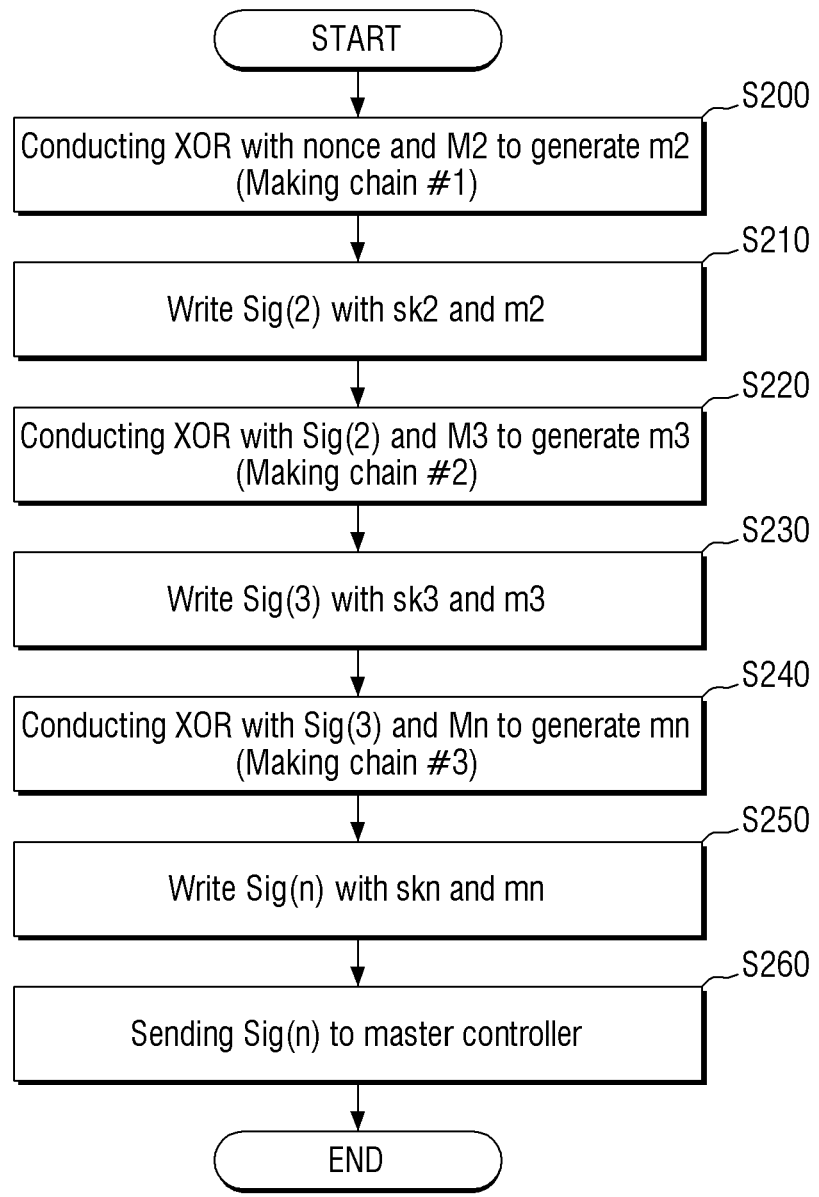
FIG. 6 is a flowchart illustrating the operation of FIG. 5.

In FIGS. 4 to 6, it is assumed that the verifier 100 sets the target devices as a second device 220-2, a third device 220-3, and an n-th device 220-n. The description provided below may also be applied to a case in which the verifier 100 sets the target devices as a plurality of other devices.

In addition, in FIGS. 4 to 6, it has been described that the target devices 220-2, 220-3, and 220-n set by the verifier 100 generate one aggregated signature Sig(n) by sending the signatures in the order of the second device 220-2, the third device 220-3, and the n-th device 220-n, but the order of generating one aggregated signature Sig(n) may follow any order determined by the verifier 100, and is not limited to the drawings. For example, if the verifier 100 sets the target devices in the order of the n-th device 220-n, the third device 220-3, and the second device 220-2, one aggregated signature may be generated in the order of the n-th device 220-n, the third device 220-3, and the second device 220-2.

In addition, in FIGS. 4 and 6, it has been described as an example that one aggregated signature is generated using a public key encryption algorithm and an exclusive OR (XOR) operation, but the trusted computing system 10 according to some exemplary embodiments may also generate one aggregated signature through another algorithm.

For example, the trusted computing system 10 according to some exemplary embodiments may generate one aggregated signature using Rivest Shamir Adleman (RSA), Elliptic Curve Digital Signature Algorithm (ECDSA), Digital Signature Algorithm (DSA), or Post Quantum Cryptography (PQC) based public key encryption algorithm.

Referring to FIGS. 4 to 6, the master controller 210 that receives the nonce (Non) from the verifier 100 sends the nonce (Non) to the second device 220-2. The second device 220-2 conducts an XOR operation on the nonce (Non) received from the master controller 210 and a second state value M2 included in the second device 220-2 to generate a second current value m2 (S200).

The second state value M2 may be, for example, a hash value for firmware in the second device 220-2 and a setting value of the firmware in the second device 220-2. The second state value M2 may be, for example, a value as expressed in the equation below.

$$M2 = H(Firmware \| Config)$$

Hereinafter, the description of the second state value M2 may also be applied to the description of the state values of other devices.

That is, the second device 220-2 combines or chains the nonce (Non) and the second state value M2 included in the second device 220-2 through an XOR operation to generate a first chain #1.

Thereafter, the second device 220-2 performs a signature using a second secret key sk2 and the second current value m2 corresponding to the second device 220-2 to generate a second signature Sig(2) (S210).

The second device 220-2 sends the generated second signature Sig(2) to the third device 220-3.

The third device 220-3 that receives the second signature Sig(2) from the second device 220-2 conducts an XOR operation on the second signature Sig(2) and a third state value M3 included in the third device 220-3 to generate a third current value m3 (S220).

The third state value M3 may be, for example, a hash value for firmware in the third device 220-3 and a setting value of the firmware in the third device 220-3.

That is, the third device 220-3 combines or chains the second signature Sig(2) and the third state value M3 included in the third device 220-3 through an XOR operation to generate a second chain Chain #2.

Thereafter, the third device 220-3 performs a signature using a third secret key sk3 and the third current value m3 corresponding to the third device 220-3 to generate a third signature Sig(3) (S230).

The third device 220-3 sends the generated third signature Sig(3) to the n-th device 220-n.

The n-th device 220-n that receives the third signature Sig(3) from the third device 220-3 conducts an XOR operation on the third signature Sig(3) and an n-th state value Mn included in the n-th device 220-n to generate an n-th current value mn (S240).

The n-th state value Mn may be, for example, a hash value for firmware in the n-th device 220-n and a setting value of the firmware in the n-th device 220-n.

That is, the n-th device 220-n combines or chains the third signature Sig(3) and the n-th state value Mn included in the n-th device 220-n through an XOR operation to generate a third chain Chain #3.

Thereafter, the n-th device 220-n performs a signature using an n-th secret key skn and the n-th current value mn corresponding to the n-th device 220-n to generate an n-th signature Sig(n) (S250).

The n-th signature Sig(n) generated through the n-th device 220-n may be one aggregated signature generated by combining or chaining the second signature Sig(2) and the third signature Sig(3) through the first chain Chain #1 to the third chain Chain #3.

The n-th device 220-n sends one aggregated signature Sig(n) to the master controller 210 (S260), and the master controller 210 sends one aggregated signature Sig(n) to the verifier 100.

Hereinafter, an operation in which the verifier 100 performs verification of target devices, more specifically, attestation of reliability through one received aggregated signature Sig(n) will be described in more detail with reference to FIGS. 7 to 9.

Figure 7:
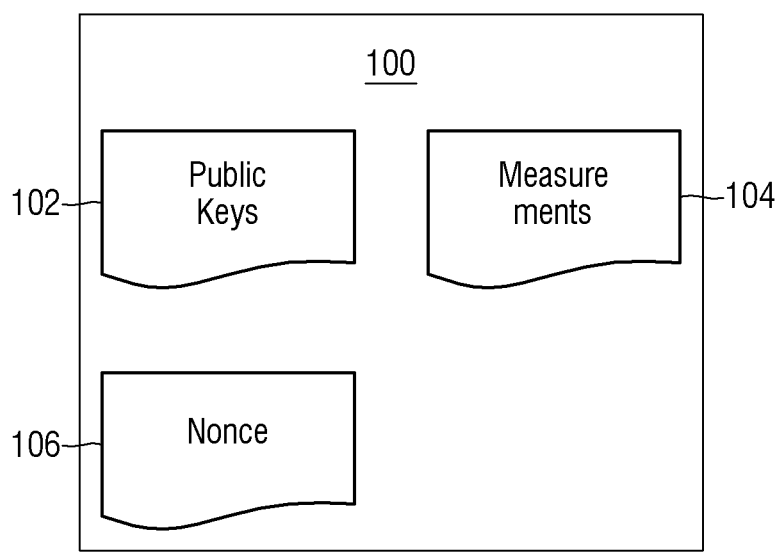
FIG. 7 is an exemplary block diagram illustrating information on devices in a platform stored in a verifier according to some exemplary embodiments.

FIG. 7 is an exemplary block diagram illustrating information on devices in a platform stored in a verifier according to some exemplary embodiments. FIG. 8 is an exemplary diagram illustrating an attestation operation of the verifier according to some exemplary embodiments. FIG. 9 is a flowchart illustrating the operation of FIG. 8.

Referring to FIGS. 1 and 7 to 9, the verifier 100 stores a public key library 102, a state value library 104, and a nonce 106 passed to the platform 200.

The public key library 102 may store public keys pk1 to pkn for each of the plurality of devices 220-1 to 220-n. The state value library 104 may store state values M1 to Mn for the plurality of devices 220-1 to 220-n, respectively. The nonce 106 is a random value generated when the verifier 100 sets the target devices and requests attestation for the target devices to the platform 200, and once generated, a nonce is not used again.

The verifier 100 may perform attestation for reliability in a reverse order of the order in which the target devices generate one aggregated signature.

An operation in which the verifier 100 performs attestation for reliability may vary according to an algorithm and an order in which the target devices generate one aggregated signature in the platform 200.

Figure 8:
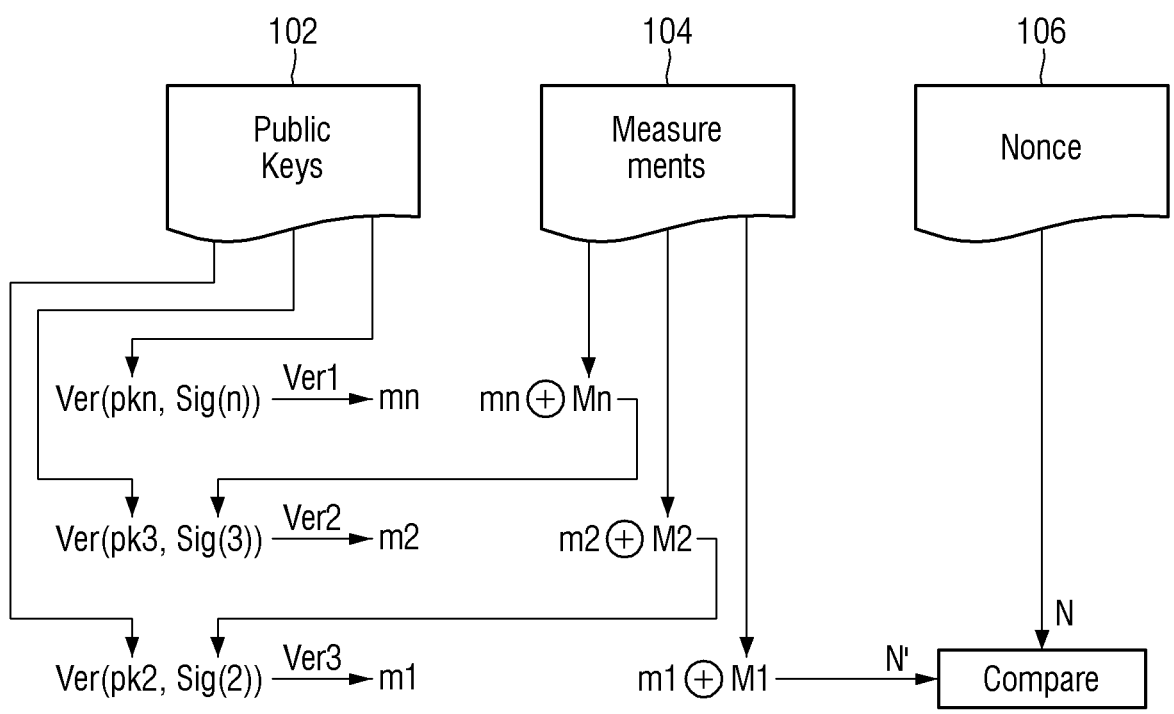
FIG. 8 is an exemplary diagram illustrating an attestation operation of a verifier according to some exemplary embodiments.
Figure 9:
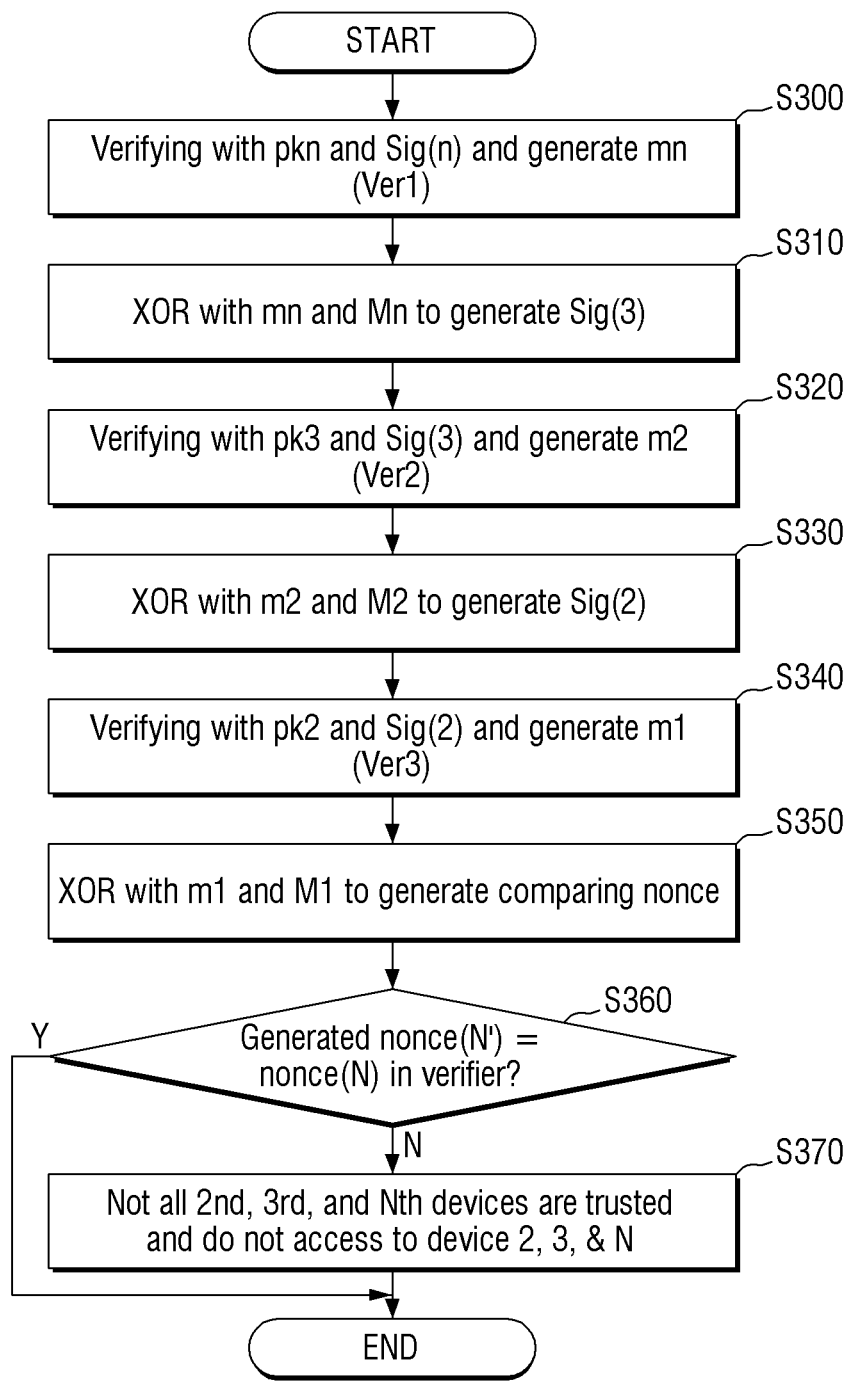
FIG. 9 is a flowchart illustrating the operation of FIG. 8.

FIGS. 7 to 9 describe a case in which one aggregated signature is generated in the platform 200 according to FIGS. 4 to 6 as an example.

With continued reference to FIGS. 1 and 7 to 9, the verifier 100 generates an n-th current value mn through a first verification operation Ver1 using the n-th public key pkn and the n-th signature Sig(n) stored in the public key library 102 (S300).

Thereafter, the verifier 100 generates a third signature Sig(3) by performing an XOR operation on the n-th state value Mn stored in the state value library 104 and the n-th current value mn generated through the first verification operation Ver1 (S310).

The verifier 100 generates a second current value m2 through a second verification operation Ver2 using the third public key pk3 and the third signature Sig(3) stored in the public key library 102 (S320).

Thereafter, the verifier 100 generates a second signature Sig(2) by performing an XOR operation on the second state value M2 stored in the state value library 104 and the second current value m2 generated through the second verification operation Ver2 (S330).

The verifier 100 generates a first current value m1 through a third verification operation Ver3 using the second public key pk2 and the second signature Sig(2) stored in the public key library 102 (S340).

Thereafter, the verifier 100 generates a comparing nonce N' by performing an XOR operation on the first state value M1 stored in the state value library 104 and the first current value m1 generated through the third verification operation Ver3 (S350).

Thereafter, the verifier 100 compares the nonce N stored in the nonce library 106 and the comparing nonce N' (S360), and if the nonce N and the comparing nonce N' are equal to each other (Y), the verifier 100 determines that reliability attestation for all of the target devices has been performed, and performs access to the target devices. If not (N), the verifier 100 determines that at least one of the target devices are unreliable and does not perform access to the target devices (S370). In this case, if the verifier 100 determines that the target devices are unreliable, the verifier 100 may additionally verify which signature of the plurality of devices 220-1 to 220-n has a defect by individually performing attestation for each of the plurality of devices 220-1 to 220-n in the platform 200.

Hereinafter, for the sake of simplification of the description, the description overlapped with the description described above will be omitted, and differences will be mainly described.

Figure 10:
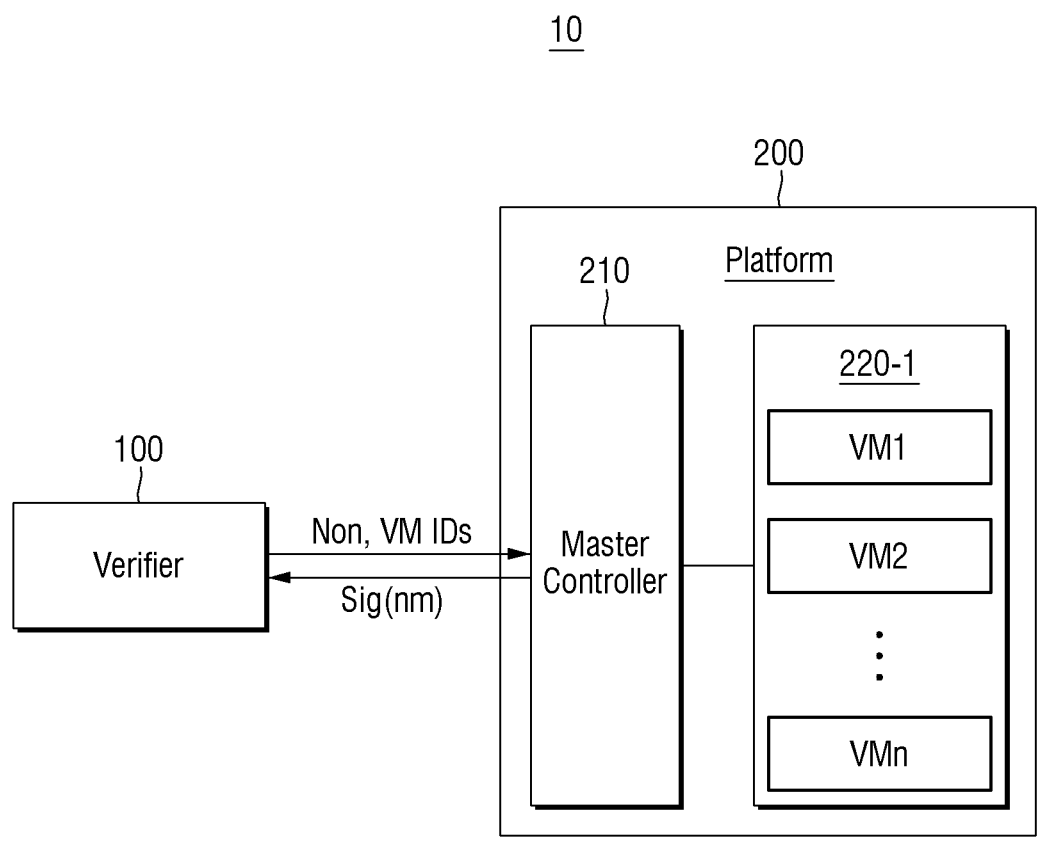
FIG. 10 is a block diagram illustrating another trusted computing system according to some exemplary embodiments.
Figure 11:
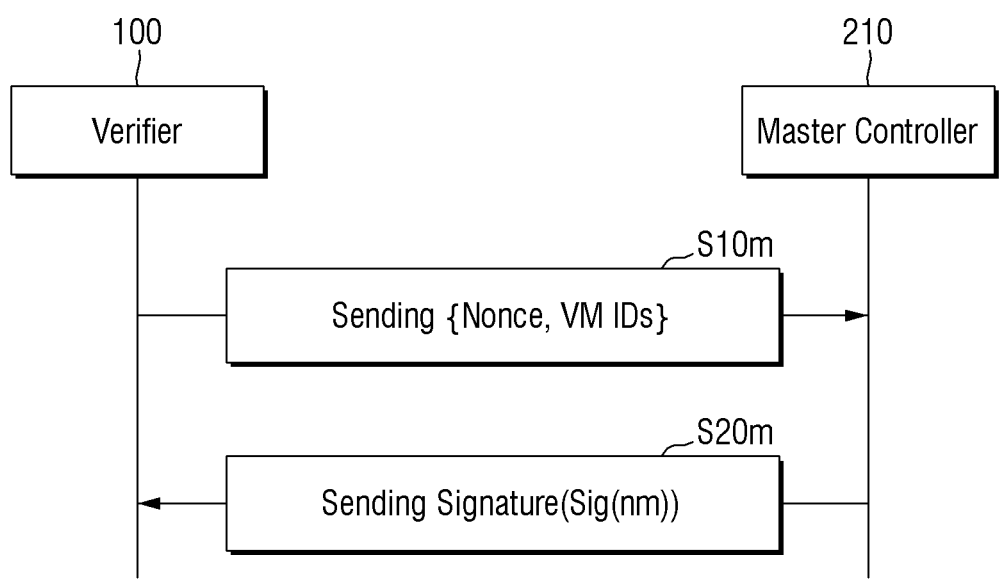
FIG. 11 is a ladder diagram illustrating an operation between a verifier and a master controller according to some exemplary embodiments.
Figure 12:
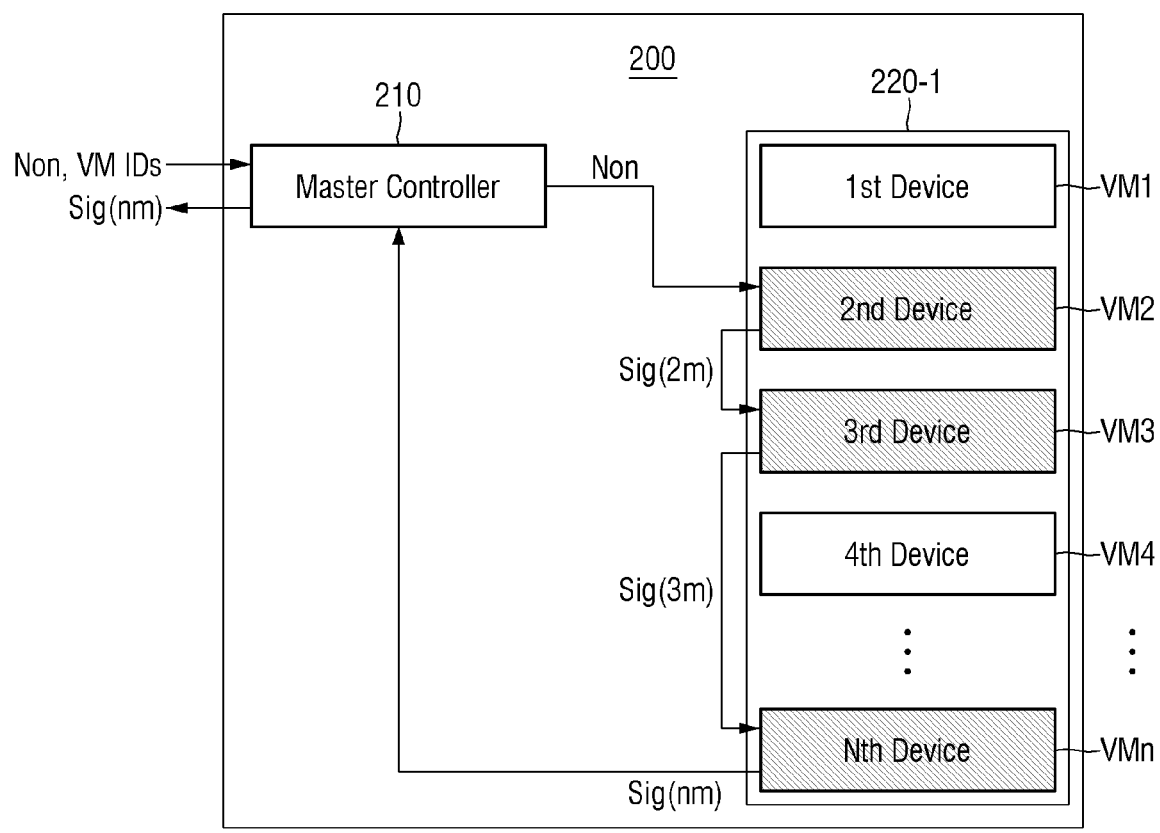
FIG. 12 is an exemplary block diagram illustrating an operation within a platform for describing an attestation method of another trusted computing system according to some exemplary embodiments.

FIG. 10 is a block diagram illustrating another trusted computing system according to some exemplary embodiments. FIG. 11 is a ladder diagram illustrating an operation between the verifier and the master controller according to some exemplary embodiments. FIG. 12 is an exemplary block diagram illustrating an operation within a platform for describing an attestation method of another trusted computing system according to some exemplary embodiments.

Referring to FIGS. 1 and 10 to 12, at least some of the plurality of devices 220-1 to 220-n may be devices that share resources with virtual machines VM1 to VMn. For example, it is assumed that the first device 220-1 shares resources with the plurality of virtual machines VM1 to VMn.

In this case, the verifier 100 may select some virtual machines to be accessed among the plurality of virtual machines VM1 to VMn as target virtual machines, and then perform reliability attestation only on the target virtual machines.

The verifier 100 sends a nonce (Non) value and virtual machine IDs (VM IDs) of target virtual machines requiring reliability attestation to the master controller 210 (S10m).

Thereafter, the target virtual machines generate one aggregated signature by combining or chaining the respective signatures in a random order, and send one aggregated signature Sig(nm) to the verifier 100 (S20m). Thereafter, the verifier 100 performs reliability attestation for all target virtual machines using only one aggregated signature.

For example, it is assumed that the verifier 100 sets the target virtual machines as a second virtual machine VM2, a third virtual machine VM3, and an n-th virtual machine VMn. The description provided below may also be applied to a case in which the verifier 100 sets the target virtual machines as a plurality of other virtual machines.

In addition, in FIGS. 10 to 12, it has been described that the target virtual machines VM2, VM3, and VMn set by the verifier 100 generate one aggregated signature Sig(nm) by sending the signatures in the order of the second virtual machine VM2, the third virtual machine VM3, and the n-th virtual machine VMn, but the order of generating one aggregated signature Sig(nm) may proceed in the order set by the verifier 100, or may be randomly set, and is not limited to these drawings. For example, one aggregated signature may be generated in the order of the n-th virtual machine VMn, the third virtual machine VM3, and the second virtual machine VM2.

The second virtual machine VM2 generates a second signature Sig(2m) using the nonce (Non) received from the master controller 210. The third virtual machine VM3 sends a third signature Sig(3m), obtained by combining or chaining the second signature Sig(2m) with its own state value, to the n-th virtual machine VMn. The n-th virtual machine VMn sends the n-th signature Sig(nm) to the master controller 210 by combining or chaining the third signature Sig(3m) with its own state value. The master controller 210 sends the n-th signature Sig(nm) to the verifier 100, and the verifier 100 performs verification on the target virtual machines VM2, VM3, and VMn using the n-th signature Sig(nm), and more specifically, reliability attestation.

Figure 13:
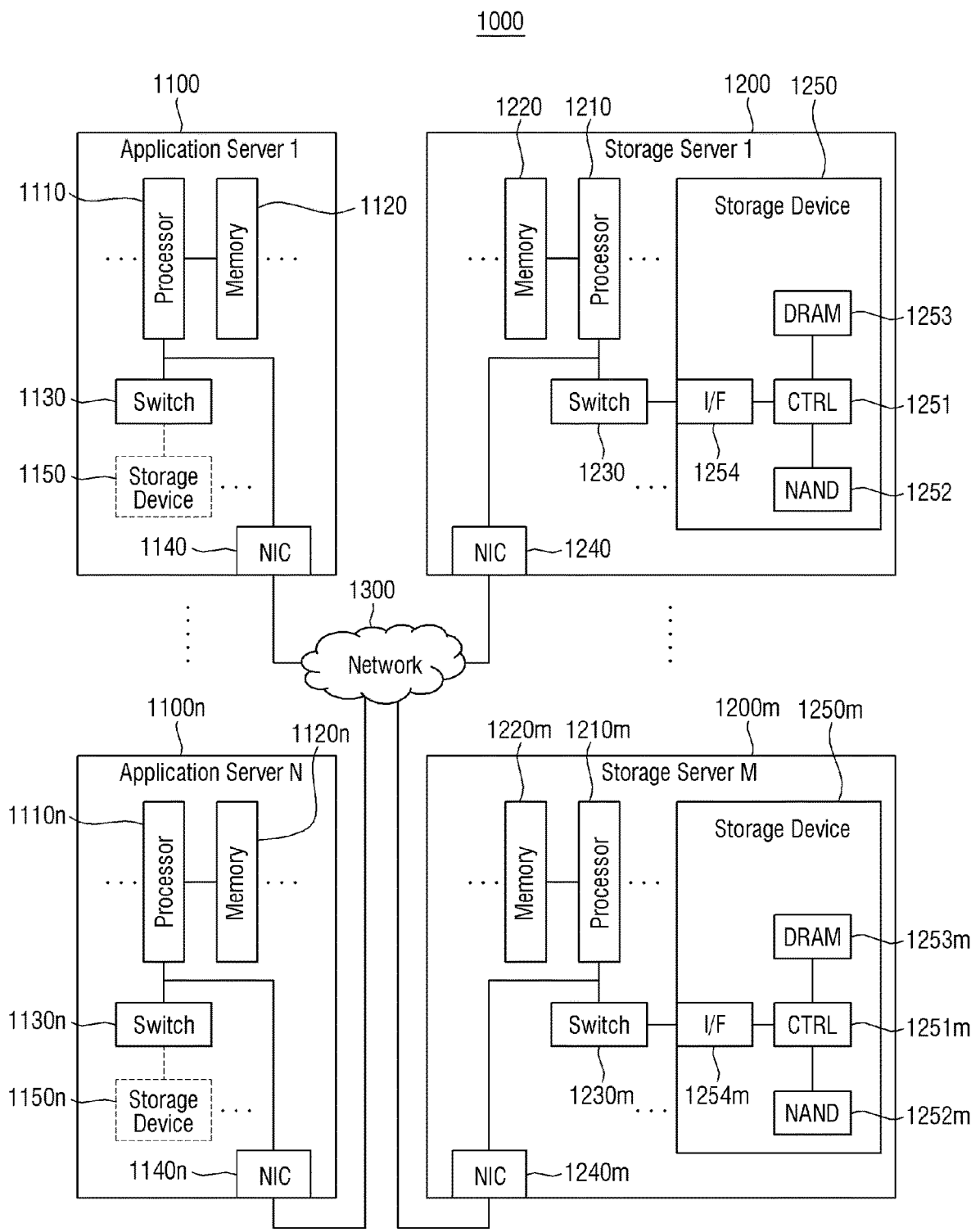
FIG. 13 is an exemplary block diagram illustrating a data center to which a trusted computing system according to some exemplary embodiments is applied.

FIG. 13 is an exemplary block diagram illustrating a data center to which a trusted computing system according to some exemplary embodiments is applied.

Referring to FIG. 13, a data center 1000 is a facility that collects various types of data and provides services, and may also be referred to as a data storage center. The data center 1000 may be, for example, a system for operating a search engine and a database, and may be a computing system used in a business such as a bank or a government institution. The data center 1000 may include application servers 1100 to 1100n and storage servers 1200 to 1200m. The number of application servers 1100 to 1100n and the number of storage servers 1200 to 1200m may be variously selected according to the exemplary embodiment, and may be different from each other.

The application server 1100 may include at least one of processors 1110, . . . 1110n and at least one of memories 1120, . . . 1120n the storage server 1200 may include at least one of processors 1210, . . . 1210m and at least one of memories 1220, . . . 1220m. If the storage server 1200 is described as an example, the processor 1210 may control an overall operation of the storage server 1200, and may access the memory 1220 to execute instructions and/or data loaded into the memory 1220. The memory 1220 may be a double data rate synchronous DRAM (DDR SDRAM), a high bandwidth memory (HBM), a hybrid memory cube (HMC), a dual in-line memory module (DIMM), an optane DIMM, and/or a non-volatile DIMM (NVMDIMM). According to an exemplary embodiment, the number of processors 1210 and the number of memories 1220 included in the storage server 1200 may be variously selected. In one exemplary embodiment, the processor 1210 and the memory 1220 may provide a processor-memory pair. In one exemplary embodiment, the number of processors 1210 and the number of memories 1220 may be different from each other. The processor 1210 may include a single-core processor or a multi-core processor. The description of the storage server 1200 may also be similarly applied to the application server 1100. According to an exemplary embodiment, the application server 1100 may not include a storage device 1150. The storage server 1200 may include one or more storage devices 1250. The number of storage devices 1250 included in the storage server 1200 may be variously selected according to exemplary embodiments.

The application servers 1100 to 1100n and the storage servers 1200 to 1200m may communicate with each other through a network 1300. The network 1300 may be implemented using a fiber channel (FC) or Ethernet. In this case, the FC is a medium used for relatively high-speed data transmission, and an optical switch that provides high performance/high availability may be used. Depending on the access method of the network 1300, the storage servers 1200 to 1200m may be provided as file storage, block storage, or object storage.

In one exemplary embodiment, the network 1300 may be a storage-only network, such as a storage area network (SAN). For example, the SAN may be an FC-SAN that uses an FC network and is implemented according to an FC protocol (FCP). As another example, the SAN may be an IP-SAN that uses a TCP/IP network and is implemented according to an SCSI over TCP/IP or Internet SCSI (iSCSI) protocol. In another exemplary embodiment, the network 1300 may be a generic network, such as a TCP/IP network. For example, the network 1300 may be implemented according to protocols such as FC over Ethernet (FCoE), Network Attached Storage (NAS), and NVMe over Fabrics (NVMe-oF).

Hereinafter, the application server 1100 and the storage server 1200 will be mainly described. The description of the application server 1100 may also be applied to another application server 1100n, and the description of the storage server 1200 may also be applied to another storage server 1200m.

The application server 1100 may store data requested to be stored by a user or a client in one of the storage servers 1200 to 1200m through the network 1300. In addition, the application server 1100 may acquire data requested to be read by a user or a client from one of the storage servers 1200 to 1200m through the network 1300. For example, the application server 1100 may be implemented as a web server or a database management system (DBMS).

The application server 1100 may access a memory 1120n or a storage device 1150n included in another application server 1100n through the network 1300, or may access memories 1220 to 1220m or storage devices 1250 to 1250m included in the storage servers 1200 to 1200m through the network 1300. Accordingly, the application server 1100 may perform various operations on data stored in the application servers 1100 to 1100n and/or the storage servers 1200 to 1200m. For example, the application server 1100 may execute a command for moving or copying data between the application servers 1100 to 1100n and/or the storage servers 1200 to 1200m. In this case, the data may be moved to the memories 1120 to 1120n of the application servers 1100 to 1100n through the memories 1220 to 1220m of the storage servers 1200 to 1200m from the storage devices 1250 to 1250m of the storage servers 1200 to 1200m, or may be directly moved thereto. The data moving through the network 1300 may be encrypted data for security or privacy.

If the storage server 1200 is described as an example, an interface 1254 may provide a physical connection between the processor 1210 and the controller 1251 and a physical connection between the network interconnect (NIC) 1240 and the controller 1251. For example, the interface 1254 may be implemented in a direct attached storage (DAS) method for directly connecting the storage device 1250 with a dedicated cable. In addition, for example, the interface 1254 may be implemented in various interface manners such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a universal serial bus (USB), a secure digital (SD) card, a multi-media card (MMC), an embedded multi-media card (eMMC), a universal flash storage (UFS), an embedded UFS (eUFS), and/or a compact flash (CF) card interface.

The storage server 1200 may further include a switch 1230 and a NIC 1240. The switch 1230 may selectively connect the processor 1210 and the storage device 1250 or selectively connect the NIC 1240 and the storage device 1250 under the control of the processor 1210.

In one exemplary embodiment, the NIC 1240 may include a network interface card, a network adapter, and the like. The NIC 1240 may be connected to the network 1300 by a wired interface, a wireless interface, a Bluetooth interface, an optical interface, or the like. The NIC 1240 may include an internal memory, a digital signal processor (DSP), a host bus interface, and the like, and may be connected to the processor 1210 and/or the switch 1230 through a host bus interface. The host bus interface may also be implemented as one of the examples of interface 1254 described above. In one exemplary embodiment, the NIC 1240 may be integrated with at least one of the processor 1210, the switch 1230, and the storage device 1250.

In the storage servers 1200 to 1200*m* or the application servers 1100 to 1100*n*, the processor may program or read data by sending a command to the storage devices 1150 to 1150*n* and 1250 to 1250*m* or the memories 1120 to 1120*n* and 1220 to 1220*m*. In this case, the data may be error-corrected data through an error correction code (ECC) engine. The data is data processed by data bus inversion (DBI) or data masking (DM), and may include cyclic redundancy code (CRC) information. The data may be encrypted data for security or privacy.

The storage devices 1150 to 1150*n* and 1250 to 1250*m* may send a control signal and a command/address signal to NAND flash memory devices 1252 to 1252*m* in response to a read command received from the processor. Accordingly, when data is read from the NAND flash memory devices 1252 to 1252*m*, a read enable (RE) signal may be input as a data output control signal and serve to output the data to a DQ bus. A data strobe (DQS) may be generated using the RE signal. The command and address signals may be latched in a page buffer according to a rising edge or a falling edge of a write enable (WE) signal.

The controller 1251 may control an overall operation of the storage device 1250. In one exemplary embodiment, the controller 1251 may include a static random access memory (SRAM). The controller 1251 may write data to the NAND flash 1252 in response to a write command, or may read data from the NAND flash 1252 in response to a read command. For example, the write command and/or the read command may be provided from a processor 1210 in the storage server 1200, a processor 1210*m* in another storage server 1200*m*, or processors 1110 and 3110*n* in the application servers 1100 and 3100*n*. A DRAM 1253 may temporarily store (buffer) data to be written to the NAND flash 1252 or data read from the NAND flash 1252. In addition, the DRAM 1253 may store metadata. Here, the metadata is user data or data generated by the controller 1251 to manage the NAND flash 1252. The storage device 1250 may include a secure element (SE) for security or privacy.

A person skilled in the art would understand that, in combination with the examples described in the embodiments, elements and algorithm operations may be implemented by electronic hardware, computer software, or a combination thereof. Whether these functions are executed in the manner of hardware or software depends on specific applications and design constraints of the technical solutions. A person skilled in the art would use different methods to implement the described functions for each particular application, but it is not to be considered that the implementation goes beyond the scope of the disclosure.

In combination with the embodiments herein, operations of the method or algorithm described herein may be implemented using hardware, a software module executed by a processing chip, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms known in the art.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A computing device in a trusted computing system, the trusted computing system comprising a plurality of devices and a master controller configured to control the plurality of devices, the computing device comprising:
   at least one memory configured to store program code; and
   at least one processor configured to read the program code and operate as instructed by the program code, the program code comprising:
   transmission code configured to cause the at least one processor to transmit, to the master controller, a first identification (ID) for a first device selected among the plurality of devices, a second ID for a second device selected among the plurality of devices, and a nonce;
   receiving code configured to cause the at least one processor to receive, after the transmission of the first ID, the second ID and the nonce, an aggregated signature from the master controller; and
   attestation code configured to cause the at least one processor to perform attestation for the first device and the second device based on the aggregated signature,
   wherein the aggregated signature is based on generation of a first signature, by the first device, by using the nonce, and generation of a second signature, by the second device, by using the first signature.

2. The computing device of claim 1, wherein the first device and the second device are respectively configured to aggregate the first signature and the second signature using a public key encryption algorithm, and the second signature is received as the aggregated signature.

3. The computing device of claim 2, wherein the first device and the second device respectively aggregate the first signature and the second signature using Rivest Shamir Adleman (RSA), and
wherein the first signature is generated based on:
generating, by the first device, a first current value by performing an XOR operation on the nonce and a first state value for the first device; and
performing, by the first device, a signature based on the first current value and a first secret key of the first device.

4. The computing device of claim 3, wherein the second signature is generated based on:
generating, by the second device, a second current value by performing an XOR operation on the first signature and a second state value for the second device; and
performing, by the second device, a signature based on the second current value and a second secret key of the second device.

5. The computing device of claim 1, further comprising a storage configured to store:
a public key library that stores a first public key for the first device and a second public key for the second device;
a state value library that stores a first state value for the first device and a second state value for the second device; and
a nonce library that stores the nonce.

6. The computing device of claim 5, wherein the attestation code is further configured to cause the at least one processor to perform the attestation for the first device and the second device using the first public key, the second public key, the first state value, the second state value, and the nonce.

7. The computing device of claim 1, wherein at least some of the plurality of devices include a plurality of virtual machines (VMs), and
wherein the transmission code is further configured to cause the at least one processor to transmit, to the master controller, a first VM ID for a first virtual machine among the plurality of virtual machines, a second VM ID for a second virtual machine among the plurality of virtual machines, and the nonce,
wherein the first device is a first virtual machine and the second device is a second virtual machine, and wherein the aggregated signature is based on generation of the first signature, by the first virtual machine, by using the nonce, and generation of the second signature, by the second virtual machine, by using the first signature.

8. An attestation method of a computing device, in a trusted computing system comprising a plurality of devices and a master controller configured to control the plurality of devices, the attestation method comprising:
transmitting, to the master controller, a first identification (ID) for a first device selected among the plurality of devices, a second ID for a second device selected among the plurality of devices, and a nonce;
receiving, after the transmission of the first ID, the second ID and the nonce, an aggregated signature from the master controller; and
performing attestation for the first device and the second device based on the aggregated signature,
wherein the aggregated signature is based on generation of a first signature, by the first device, by using the nonce, and generation of a second signature, by the second device, by using the first signature.

9. The attestation method of claim 8, wherein the first device and the second device are respectively configured to aggregate the first signature and the second signature using a public key encryption algorithm, and the second signature is received as the aggregated signature.

10. The attestation method of claim 9, wherein the first device and the second device are respectively configured to aggregate the first signature and the second signature using Rivest Shamir Adleman (RSA), and
wherein the first signature is generated based on:
generating, by the first device, a first current value by performing an XOR operation on the nonce and a first state value for the first device, and
performing, by the first device, a signature based on the first current value and a first secret key of the first device.

11. The attestation method of claim 10, wherein the second signature is generated based on:
generating, by the second device, a second current value by performing an XOR operation on the first signature and a second state value for the second device; and
performing, by the second device, a signature based on the second current value and a second secret key of the second device.

12. The attestation method of claim 8, wherein the performing the attestation comprises performing the attestation for the first device and the second device by using:
a public key library that stores a first public key for the first device and a second public key for the second device;
a state value library that stores a first state value for the first device and a second state value for the second device; and
a nonce library that stores the nonce, and
wherein the public key library, the state value library, and the nonce library are included in the computing device.

13. The attestation method of claim 12, wherein the performing the attestation comprises performing the attestation for the first device and the second device by using the first public key, the second public key, the first state value, the second state value, and the nonce.

14. The attestation method of claim 8, wherein at least some of the plurality of devices include a plurality of virtual machines (VMs), and
wherein the attestation method further includes:
transmitting, to the master controller, a first VM ID for a first virtual machine among the plurality of virtual machines, a second VM ID for a second virtual machine among the plurality of virtual machines, and the nonce, and
wherein the first device is a first virtual machine and the second device is a second virtual machine, and wherein the aggregated signature is based on generation of the first signature, by the first virtual machine, by using the nonce, and generation of the second signature, by the second virtual machine, by using the first signature.

15. A trusted computing system comprising a plurality of devices, a computing device, and a master controller configured to control the plurality of devices, the computing device comprising at least one processor and at least one memory, the at least one processor configured to execute instructions from the at least one memory to execute:
a verifier configured to attest reliability of target devices among the plurality of devices, wherein the verifier is further configured to transmit, to the master controller, a verification request for the target devices, and attest the reliability of the target devices using an aggregated signature received from the master controller, the aggregated signature being generated by combining signatures of each of the target devices, wherein the verifier is further configured to transmit, to the master controller, a first identification (ID) for a first device selected among the plurality of devices, a second ID for a second device selected among the plurality of devices, and a nonce;

wherein the verifier is further configured to receive, after the transmission of the first ID, the second ID and the nonce, the aggregated signature from the master controller; and wherein the verifier is further configured to perform attestation for the first device and the second device based on the aggregated signature, wherein the aggregated signature is based on generation of a first signature, by the first device, by using the nonce, and generation of a second signature, by the second device, by using the first signature.

16. The trusted computing system of claim 15, wherein the aggregated signature is generated by using a public key encryption algorithm.

17. The trusted computing system of claim 16, wherein the aggregated signature is generated by using Rivest Shamir Adleman (RSA), wherein the aggregated signature is generated based on:
generating, by a first part of the target devices, a first current value by using at least one first state value of the first part of the target devices, and generating the first signature by performing, by the first part of the target devices, a signature based on the first current value and a first private key of the first part of the target devices, and wherein the aggregated signature is generated based on:
generating, by a second part of the target devices, a second current value by performing an XOR operation on the first signature and a second state value of the second part of the target devices, and performing a signature based on the second current value and a second private key of the second part of the target devices.

18. The trusted computing system of claim 17, wherein the verifier includes:
a public key library that stores a first public key for the first part of the target devices and a second public key for the second part of the target devices, and
a state value library that stores the at least one first state value of the first part of the target devices and the second state value of the second part of the target devices.

19. The trusted computing system of claim 18, wherein the verifier is further configured to attest the reliability of the target devices using the first public key, the second public key, the at least one first state value, and the second state value.

20. The trusted computing system of claim 15, wherein at least some of the plurality of devices include a plurality of virtual machines,
wherein the verifier transmits, to the master controller, a verification request for target virtual machines among the plurality of virtual machines, and receives, from the master controller, the aggregated signature that is generated by combining signatures of each of the target virtual machines, and
wherein the verifier attests reliability of the target virtual machines using the aggregated signature for the target virtual machines.

* * * * *